United States Patent

Lim et al.

[11] Patent Number: 5,560,672
[45] Date of Patent: Oct. 1, 1996

[54] ENERGY ABSORBING BEAM

[75] Inventors: George G. Lim, Northville; Clifford C. Chou, Farmington Hills; Alan A. Kinnelly, Northville, all of Mich.

[73] Assignee: Ford Motor Company, Dearborn, Mich.

[21] Appl. No.: 616,242

[22] Filed: Mar. 13, 1996

Related U.S. Application Data

[63] Continuation of Ser. No. 172,799, Dec. 27, 1993, abandoned.

[51] Int. Cl.⁶ ................................... B60R 27/00
[52] U.S. Cl. .......................... 296/189; 296/203; 280/748
[58] Field of Search ................... 296/189, 203, 296/205, 39.1, 146.6, 146.7; 280/751, 748

[56] References Cited

U.S. PATENT DOCUMENTS

| | | | |
|---|---|---|---|
| 2,907,602 | 10/1959 | Lagerling | 296/84 |
| 3,779,595 | 12/1973 | Suzuki et al. | 296/189 |
| 3,806,152 | 4/1974 | Witchger | 280/150 B |
| 3,904,223 | 9/1975 | Wilfert et al. | 280/751 |
| 3,930,665 | 1/1976 | Ikawa | 280/150 B |
| 4,099,767 | 7/1978 | Kania et al. | 296/137 A |
| 4,591,204 | 5/1986 | Gallitzendoerfer et al. | 296/202 |
| 4,828,287 | 5/1989 | Siler | 280/751 |
| 5,042,872 | 8/1991 | Yoshii | 296/203 |
| 5,163,730 | 11/1992 | Welch | 296/189 |
| 5,314,229 | 5/1994 | Matuzawa et al. | 296/189 |
| 5,382,051 | 1/1995 | Glance | 296/189 |

FOREIGN PATENT DOCUMENTS

| | | | |
|---|---|---|---|
| 1115317 | 12/1954 | France. | |
| 2005894 | 12/1969 | France. | |
| 2345316 | 10/1977 | France. | |
| 1530873 | 12/1963 | Germany. | |
| 209420 | 12/1982 | Japan | 296/203 |
| 406239189A | 8/1994 | Japan | 280/751 |

*Primary Examiner*—Gary C. Hoge
*Attorney, Agent, or Firm*—Gregory P. Brown

[57] ABSTRACT

An energy absorbing structural member disposed within the passenger compartment of a motor vehicle and including an outer cell and an inner cell. The outer cell of the structural member provides conventional torsional, bending and compressive rigidity necessary for such structural member. Additionally, the inner cell is adapted to plastically deform under a predetermined generally transversely imposed load, the load being substantially insufficient to deform the outer cell.

11 Claims, 3 Drawing Sheets

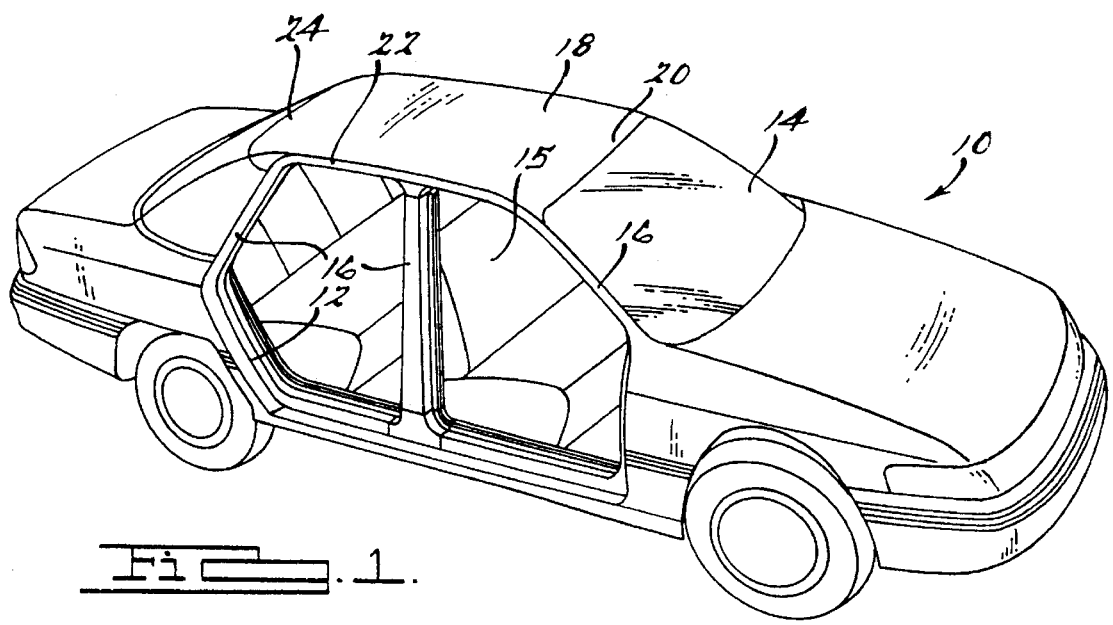
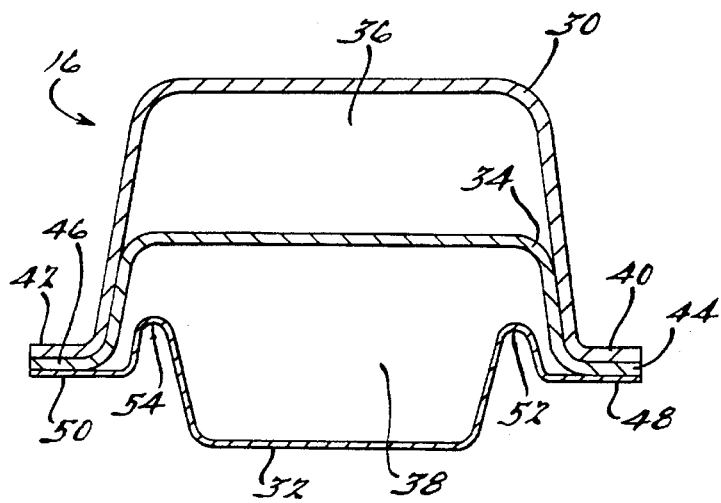
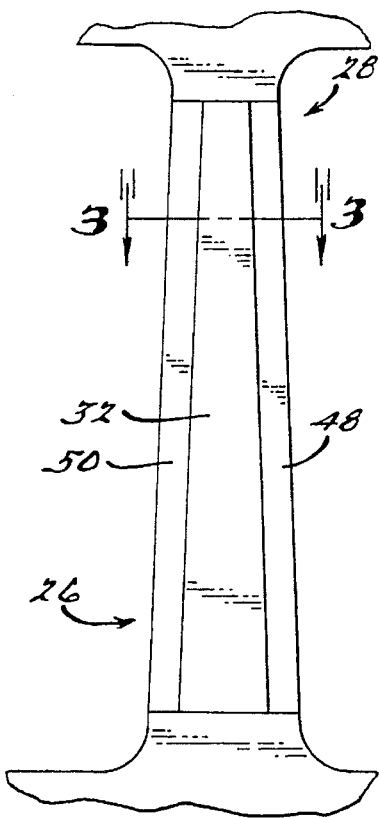

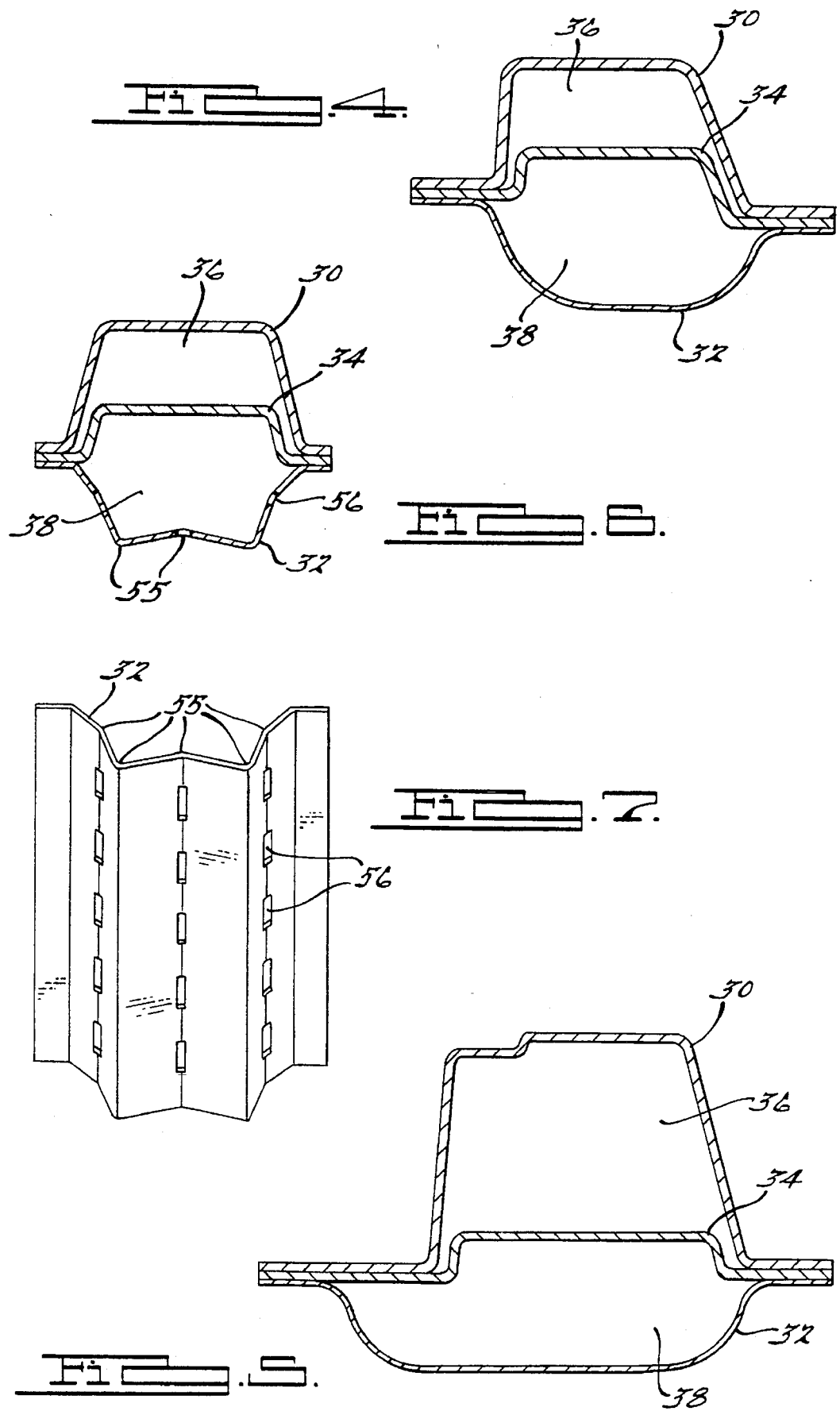

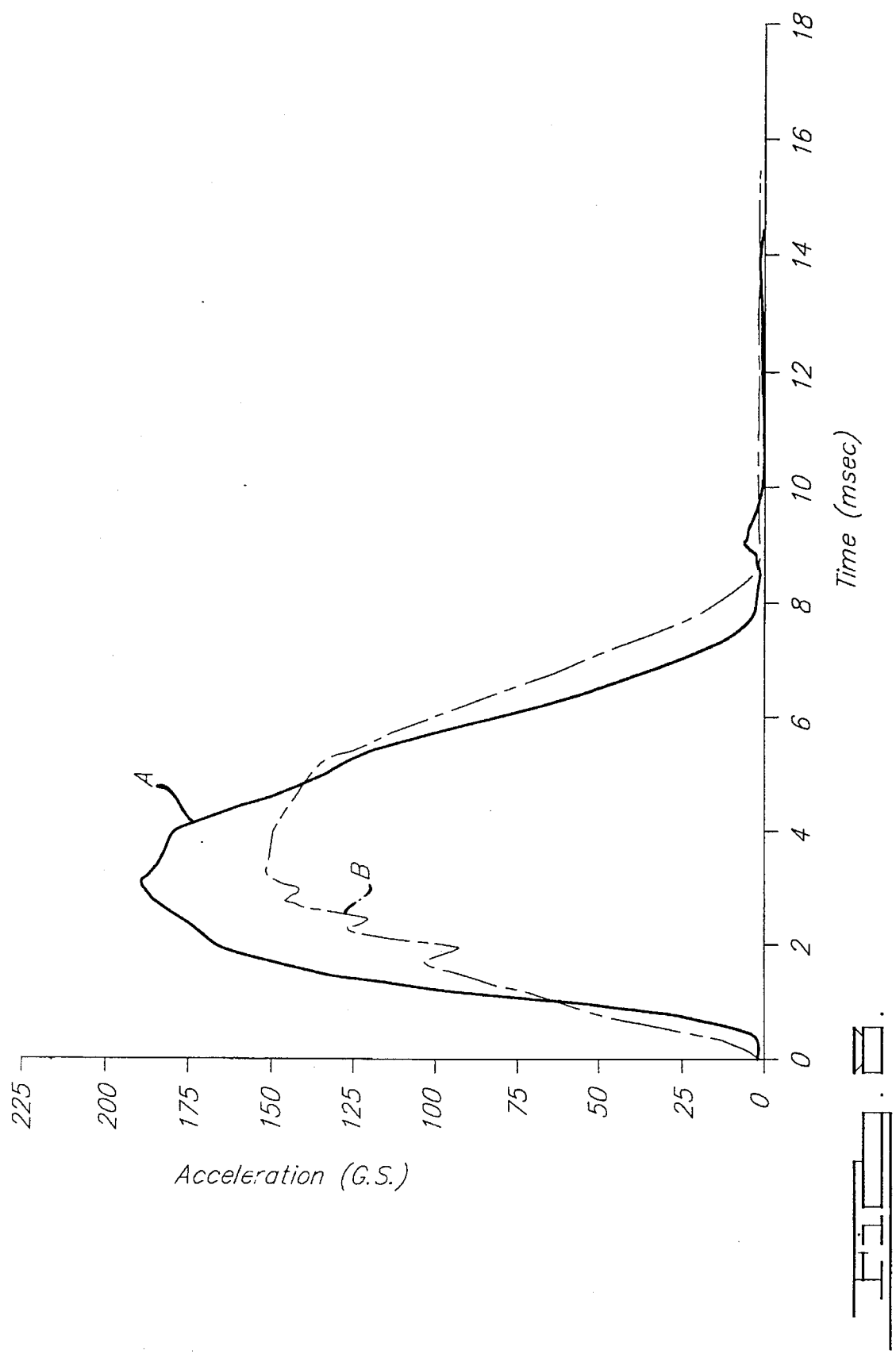

ENERGY ABSORBING BEAM

This is a continuation of application Ser. No. 08/172,799 filed Dec. 27, 1993, now abandoned.

FIELD OF THE INVENTION

This invention relates to energy absorbing structural members for use in motor vehicles. More particularly, the present invention relates to structural members used on the interior of the greenhouse of a motor vehicle.

BACKGROUND OF THE INVENTION

Structural members for supporting the roof and windows of a motor vehicle must be capable of supporting very high compressive and bending loads. These structural members are typically fabricated by joining two or more mating stamped steel sheets together. The resulting structural members are very rigid.

It would be desirable to provide a structural member for supporting the roof and windows of a motor vehicle capable of providing very high structural rigidity while at the same time enhancing the energy absorbing characteristics of the interior compartment of the motor vehicle.

SUMMARY OF THE INVENTION

The present invention enhances the energy absorbing characteristics of a structural member used in the greenhouse of a motor vehicle by providing an energy absorbing structural member having a generally longitudinal axis and being disposed within the passenger compartment of a motor vehicle. The structural member comprises an intermediate sheet of metal having a first flange and a second flange. The structural member also includes an outer cell defined by an outer sheet of metal having a first flange joined to the first flange of the intermediate sheet and a second flange joined to the second flange of the intermediate sheet. The structural member includes an inner cell defined by an inner sheet of metal disposed adjacent to the passenger compartment and having a first flange joined to the first flange of the intermediate sheet and a second flange joined to the second flange of the intermediate sheet. The inner cell is adapted to plastically deform under a predetermined generally transversely imposed load, the load being substantially insufficient to deform the outer cell.

Other objects, features and advantages of the present invention will become apparent to those skilled in the art from the drawings, detailed description and claims which follow.

BRIEF DESCRIPTION OF THE DRAWINGS

FIG. 1 is a perspective view of a motor vehicle illustrating various locations of structural members defining a greenhouse according to the present invention.

FIG. 2 is a perspective view illustrating a vertical support member constructed according to the present invention.

FIG. 3 is a sectional illustration of a structural member incorporating an inner member according to the present invention.

FIG. 4 is a sectional illustration of a structural member incorporating an inner member according to the present invention.

FIG. 5 is a sectional illustration of a structural member incorporating an inner member according to the present invention.

FIG. 6 is a sectional illustration of a structural member incorporating an inner member according to the present invention.

FIG. 7 is an perspective view of a structural member having a W-shape and a plurality of apertures according one embodiment of the present invention.

FIG. 8 is a side graphical illustration comparing the deceleration of an object impacting a conventional constructed structural member and an object striking a structural member constructed according to the present invention.

DESCRIPTION OF THE PREFERRED EMBODIMENT

Referring now to FIG. 1, a motor vehicle 10 is shown having a lower body portion 12 and a greenhouse portion 14 defining a passenger compartment 15. The greenhouse portion 14 retains the windows in the motor vehicle 10 and includes several structural members, including vertical support members 16, a roof 18, a front roof member 20, side roof members 22 and a rear roof member 24. Each of these members has a generally longitudinal axis. To simplify the description of the structural members, one of the vertical support members 16 will be described, it being understood that its unique construction applies to each of the structural members of the greenhouse 14.

Referring now to FIGS. 2 and 3, a vertical support member 16 according to the present invention is shown having a lower body portion 26 and a greenhouse portion 28. The greenhouse portion 28 of member 16 includes an outer sheet of metal 30, and an inner sheet of metal 32. The inner sheet 32 is adjacent to a passenger compartment 15 of the motor vehicle 10. The generally vertical member 16 has very high torsional, compressive and bending rigidity. Additionally, because of a unique cross-sectional design, the member is capable of providing for controlled energy absorption.

As shown in FIG. 3, the vertical support member 16 is constructed having an intermediate sheet 34 positioned between the outer sheet 30 and the inner sheet 32. This construction provides an outer cell 36 and an inner cell 38. The outer cell 36 defines the space enclosed between the outer sheet 30 and the intermediate sheet 34. The outer sheet 30 has first and second flanges 40, 42 fastened to respective first and second flanges 44, 46 of the intermediate sheet 34. The inner cell 38 defines the space enclosed between the inner sheet 32 and the intermediate sheet 34. The inner sheet 32 is generally formed as a structural hat section having a U-shaped portion and first and second out-turned flanges 48, 50 fastened to respective first and second flanges 44, 46 of the intermediate sheet 34.

In the preferred embodiment, the flanges 40, 44 and 48 are fastened by spot welding at substantially 25 mm intervals. The weld pitch may be varied according to the structural demands of the particular member, as is commonly known in the art. Similarly, flanges 42, 46 and 50 are also fastened by spot welding. However, one skilled in the art should recognize that other means for fastening would provide equivalent functionality and operability. For example, the flanges could be bonded or riveted, or a combination of any similarly well known fastening techniques.

The outer cell 36 provides the primary strength of the member 16. In the preferred embodiment, the outer sheet 30 and the intermediate sheet 34 have metal thicknesses in the range of 1.6 mm–2.0 mm. The outer cell 36 may be hollow, or it may be reinforced with metal tubes or brackets. The strength of the outer cell 36 may be enhanced by using ceramic bead or foam filler. The inner sheet 32 is constructed from sheet metal having a reduced metal thickness as compared to the intermediate and outer sheets 34, 30. Generally, the metal thickness of the inner sheet 32 falls within a range between 0.66 mm–1.0 mm, or 30%–70% of the intermediate sheet 34. In the preferred embodiment, providing an inner sheet 32 having a metal thickness roughly equivalent to 50% of the thickness of the intermediate sheet has been found to be desirable.

The inner cell 38 enhances the rigidity of the overall member 16 even though the inner sheet 32 is constructed to provide less lateral resistance to deformation against forces acting normal to its surface. In this way, an outwardly directed force applied from inside the vehicle will cause the inner sheet 32 to plastically deform, thereby absorbing energy. As this occurs, the outer cell is unaffected due to its substantially greater rigidity. It is this relationship between the lateral resistance to deformation of the inner sheet 32 and the rigidity of the outer cell 36 that provides the controllable energy absorption. Therefore, it should be understood that any variety of metal thicknesses can be used, as long as this relationship exists.

In addition to reducing the metal thickness of the inner sheet 32 to reduce its resistance to deformation, the inner sheet 32 may be provided with a unique cross-sectional shape. The cross-section may be designed to enhance the control of the energy absorption by reducing the amount of force necessary to induce plastic deformation of the inner sheet 32 while not deforming the outer cell 36. FIG. 3 illustrates one cross-sectional shape capable of providing this function. The inner sheet 32 is formed having U-shaped portions 52, 54 adjacent to the flanges 48, 50. When the inner sheet 32 is subjected to load, the U-shaped portions induce deformation. FIGS. 4 and 5 illustrate D-shaped members utilizing a generous radius to induce the onset of plastic deformation of the inner sheet. FIG. 6 illustrates yet another variation, a W-shaped section having hinge points 55 to induce plastic deformation.

Yet another way of reducing the resistance of the inner sheet 32 to deformation may be to create the inner sheet 32 having apertures 56 as shown in FIG. 7. These apertures 56 create hinge points that induce deformation. Advantageously, each of these alternative designs is mutually independent. If necessary, a member 16 could be designed with an inner panel having each of the alternates in a single design permitting the use of sheet metal having varying metal thickness, thereby allowing a tuning of the member to balance between energy absorption and the conventional strength characteristics of the member.

In the preferred embodiment, the structural members are constructed from substantially rigid material, such as a stamped steel. However, the present invention is not so limited. Construction of the structural member from aluminum, or a composite of aluminum, steel and other materials is contemplated. The inner sheet 32 could be constructed from wire mesh, having foam or other material interlaced therein.. Additionally, incremental energy management can be achieved by placing foam within the inner cell 38 or placing foam on the exterior surface of the inner sheet 32.

Referring now to FIG. 8, graphical representation of test data illustrates the effectiveness of the present invention. The deceleration of an object possessing kinetic energy upon striking the inner sheet of the structural beam is shown. As the kinetic energy of the moving object is transferred to the support member the inner member undergoes plastic deformation, thereby absorbing the kinetic energy in a controlled manner and decreasing the magnitude of the deceleration pulse imparted upon the moving object. The forces generated in decelerating the moving object are sufficient to deform the inner sheet, however, they are not large enough to impart substantial deformation on the outer cell. The line denoted by "A" represents a vertical support member constructed in a conventional manner having an inner and an outer sheet. Line "B" represents the reduction in magnitude of the deceleration when the vertical member is designed in accordance with the present invention.

Various other modifications and permutations of the present invention, no doubt, will occur to those skilled in the art. Therefore, it is the following claims, including all equivalents, which define the scope of the present invention.

We claim:

1. An energy absorbing structural member having a generally longitudinal axis and being disposed within the passenger compartment of a motor vehicle, the structural member comprising:

an intermediate sheet of metal having a first flange and a second flange;

an outer cell defined by an outer sheet of metal having a first flange joined to said first flange of said intermediate sheet and a second flange joined to said second flange of said intermediate sheet;

an inner cell defined by an inner sheet of metal disposed adjacent to said passenger compartment and having an inverted U-shape and a first out-turned flange joined to said first flange of said intermediate sheet and a second out-turned flange joined to said second flange of said intermediate sheet; and said inner cell being adapted to plastically deform under a predetermined generally transversely imposed load, said load being substantially insufficient to deform said outer cell.

2. An energy absorbing structural member as claimed in claim 1, wherein said inner cell forms a generally polygonal shape.

3. An energy absorbing structural member as claimed in claim 1, wherein said inner sheet further includes a u-shaped living hinge adjacent to each of said flanges.

4. An energy absorbing structural member as claimed in claim 1, wherein said inner sheet defines a W-shape.

5. An energy absorbing structural member as claimed in claim 1, said inner sheet having a metal thickness approximately 50% of the intermediate sheet.

6. An energy absorbing structural member as claimed in claim 1, wherein said inner sheet further includes means for selectively reducing the stiffness of said inner sheet.

7. An energy absorbing structural member as claimed in claim 6, said means includes a plurality of apertures.

8. An energy absorbing structural member as claimed in claim 1, wherein said outer sheet is fastened to said intermediate sheet by welding and said inner sheet is fastened to said intermediate sheet by welding.

9. An energy absorbing structural member as claimed in claim 7, wherein said apertures comprise slots having a primary axis parallel with a longitudinal axis of said member.

10. An energy absorbing structural member as claimed in claim 8, wherein welding occurs substantially at 25 mm intervals along said flanges.

11. A motor vehicle having a greenhouse structure disposed on a lower body portion of said motor vehicle, said greenhouse structure being adapted to provide support for a roof and a windshield, the greenhouse structure comprising:

- a plurality of generally vertical sheet metal members extending upward from said lower body portion, each of said members having an interior surface and first and second flanges;
- an upper horizontal member extending across the top of said windshield and attaching at each end to at least one of said vertical members, and having an interior surface and first and second flanges;
- a sheet metal structural hat section having an inverted U shape with first and second out-turned flanges for attaching said first and second flanges of at least one of said vertical or horizontal members, said hat section defining an inner cell between said hat section and said member, said inner cell being adapted to plastically deform under a predetermined load, which is substantially insufficient to deform said member.

* * * * *